UNITED STATES PATENT OFFICE.

EDWARD ALFRED PATERSON, OF THOROLD, CANADA.

BINDER FOR ROADS, &c., AND PROCESS OF MAKING SAME.

1,266,618.   Specification of Letters Patent.   Patented May 21, 1918.

No Drawing.   Application filed January 5, 1916.   Serial No. 70,481.

*To all whom it may concern:*

Be it known that I, EDWARD A. PATERSON, a subject of the King of Great Britain, residing in Thorold, in the Province of Ontario and Dominion of Canada, have invented certain new and useful Improvements in Binders for Roads, &c., and Processes of Making Same, of which the following is a specification.

The object of the present invention is an efficient petrescent binding material for use in making roads, pavements, building blocks, walls, dams, pillars, and other objects for which weather resisting qualities are particularly desirable.

My invention also includes a process for making the composition, as well as the composition.

I aim to produce a suitable binder for all agglomerates, particularly those of petrean character.

In carrying out my invention I aim to produce in my binder a certain proportion of silicic acid or silica. To produce this effect I treat a silicate of an alkali metal, preferably $2Na_2O.3SiO_2$, for instance, with boric acid or some equivalent thereof. The boric acid unites with a portion of the $Na_2O$ content of the silicate, first replacing a chemically equivalent amount of silicic acid, which latter unites with some of the remaining sodium silicate forming a sodium silicate richer in silica than that originally used. When a point is reached, at which more silica is present than can stay combined as silicate, a portion is set free, first forming soluble silicic acid, which later becomes converted into the insoluble form, $SiO_2$.

The binder after use gradually absorbs $CO_2$ from the air, forming more $SiO_2$ and $Na_2CO_3$ or $NaHCO_3$ which with the $Na_2B_4O_7$ produced by the reaction of boric acid on sodium silicate, are gradually leached out, by rain or other water, leaving the skeleton of silica, to act as a binder, for which purpose it is highly efficient. The leachings being in very dilute condition are harmless to vegetation, to the feet of horses, to organic matter, etc., with which it may come into contact.

As a modified form of procedure, and in order to economize in the use of boric acid, I may replace a part of such acid by calcium chlorid. In this the calcium chlorid reacts to produce calcium hydroxid, and the chlorin and sodium unite, forming sodium chlorid, which is soluble. The calcium hydroxid will subsequently combine with a portion of the free silicic acid to form a silicate.

The advantage of using an alkali metal silicate with a silica content as high as that stated, is that the part left behind after use, and after the soluble products of the reaction have been washed away, is comparatively large. It is not only large but the silica left is hard, resistant, inert and enduring. As a suitable silicate of the kind I need, I may mention one having the formula $2Na_2O.3SiO_2 + nH_2O$. The binder produced in accordance with the present invention is to be employed in the manner now well understood in the art, as more fully described in my Patent 1,171,236, issued February 8, 1917.

Having thus described my invention, what I claim as new and desire to secure by Letters Patent, is:

1. A petrescent binder for agglomerates of petrean character, containing a silicate of an alkali metal, free silicic acid, and a constituent gradually removable by weathering.

2. A binder for stony agglomerates consisting of a soluble sodium silicate, calcium chlorid, freed silicic acid, and a constituent gradually removable by weathering.

3. The method herein described of producing a petrescent binder, for agglomerates of a petrean character which comprises adding to a solution of a silicate of an alkali metal, an acid capable of combining with a portion of the alkali metal base to form a salt which in solution is harmless to organic substances, and thus freeing a portion of the silica content of the silicate.

4. The method herein described of producing a petrescent binder for agglomerates of a petrean character, which consists in treating a solution of an alkali metal silicate having a high silica content with a soluble haloid salt of an alkaline earth metal and with an acid capable of combining with alkali metal base of such silicate to form a salt which in solution is harmless to organic substances, and thus forming an insoluble silicate and freeing a portion of the silica content of the silicate.

5. The method herein described of producing a petrescent binder for agglomerates of a petrean character, which consists in treating a solution of a sodium silicate, with calcium chlorid and with boric acid whereby part of the silica is set free as silicic acid, and an insoluble calcium silicate together with soluble sodium chlorid and sodium borate are formed.

In testimony whereof, I have hereunto subscribed my name.

EDWARD ALFRED PATERSON.

Witnesses:
 LLOYD B. WIGHT,
 M. E. BURRELL.